Sept. 9, 1952

H. F. SMITH 2,609,830

FLUSH TANK INLET VALVE

Filed Nov. 23, 1948

INVENTOR.
HARRY FORD SMITH
BY Richey & Watts
ATTORNEYS

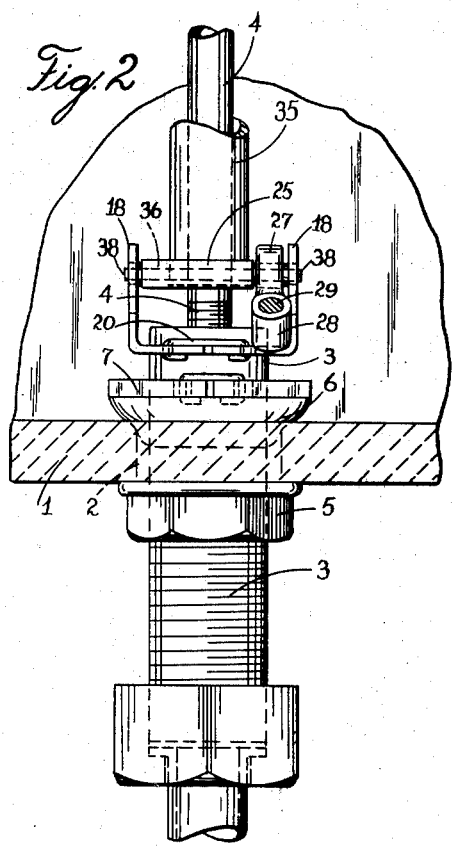

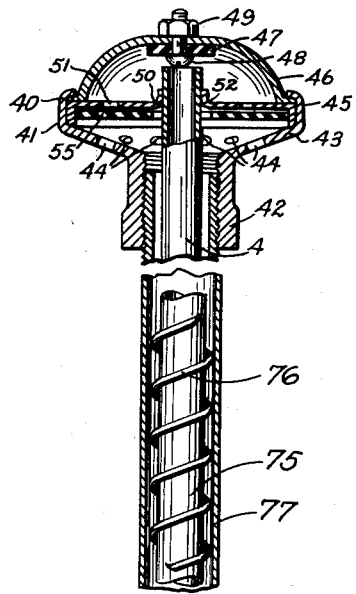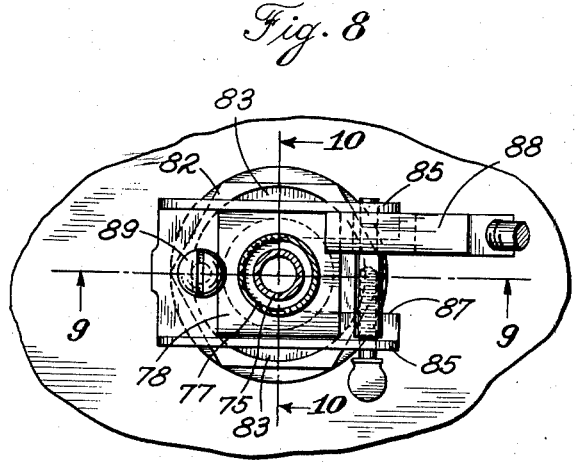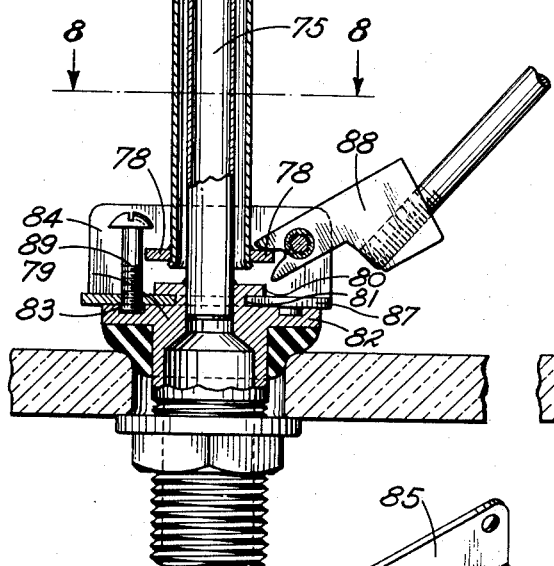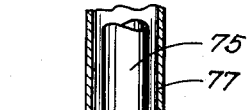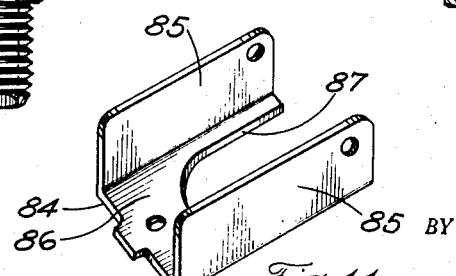
INVENTOR.
HARRY FORD SMITH

Patented Sept. 9, 1952

2,609,830

UNITED STATES PATENT OFFICE 2,609,830

FLUSH TANK INLET VALVE

Harry Ford Smith, Lexington, Ohio, assignor to Mansfield Sanitary Pottery, Inc., Perrysville, Ohio, a corporation of Ohio Application November 23, 1948, Serial No. 61,646

12 Claims. (Cl. 137—437)

The present invention relates generally to flush tanks and particularly to a new, non-siphoning, ball cock for such tanks.

The main objective of the present invention is to devise a ball cock for flush tanks which will not possess the many disadvantages of the prior art and which will possess many new advantages. This invention has attained that objective by the provision of new parts and new combinations of parts. Apparatus embodying the present invention includes new means for sealing an inlet pipe in an opening in the tank so that the pipe may be readily removed even though the outside clamping nut has seized thereon. It also includes a hush pipe and means for reciprocating the hush pipe endwise while permitting it to rotate about the inlet pipe and maintaining it coaxial with the inlet pipe. It also includes hush pipe reciprocating means which embodies a float arm which adjustably regulates the extent of opening of the inlet pipe valve and a float arm carrying lever which has a rack and pinion connection with the hush pipe to move the latter endwise. It also includes a water pressure and vacuum sensitive water pressure reducing valve associated with a hush pipe. Apparatus embodying the present invention has been found to be virtually noiseless and free, easy and certain in operation, and the parts of the apparatus are simple, easy to manufacture, inexpensive, and are virtually foolproof as regards assembly and disassembly by unskilled persons.

The present invention will be better understood by those skilled in the art from the following description and the drawings which accompany this specification and in which Fig. 1 is a side elevational view, partly in section, of an embodiment of the present invention;

Fig. 2 is a side elevational view, partly in section, taken on line 2—2 of Fig. 1;

Fig. 3 is a horizontal, sectional view, taken on line 3—3 of Fig. 1;

Fig. 4 is a top plan view of one of the separable, gasket engaging flanges of the apparatus of Fig. 1;

Figs. 5 and 6 are, respectively, top plan and side elevational views of one of the parts of the bracket of Fig. 1;

Fig. 7 is a fragmentary, vertical, sectional view of a modified form of inlet pipe valve;

Fig. 8 is a top plan view of a modified form of apparatus embodying the present invention;

Figure 1:
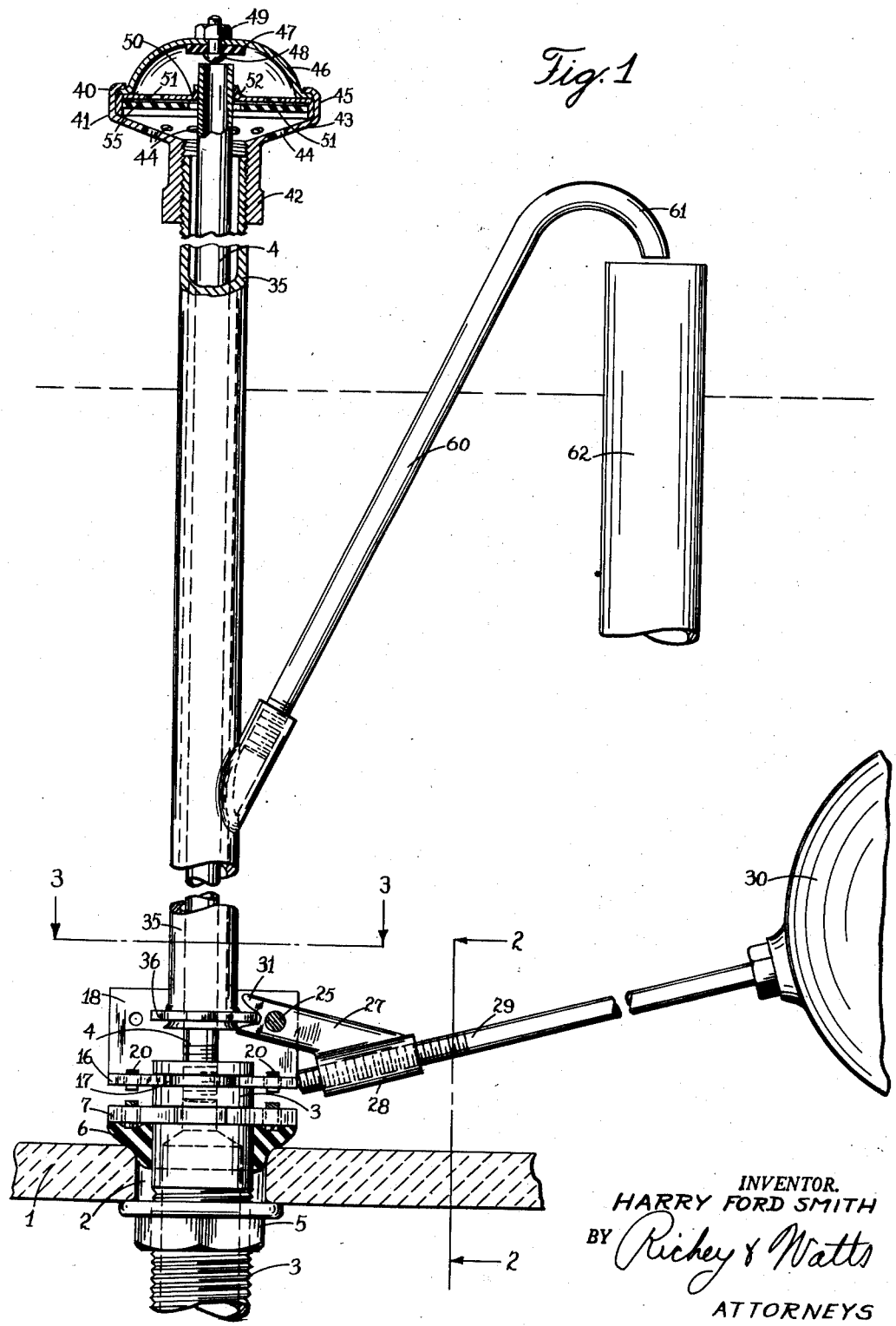

Figs. 9 and 10 are vertical, sectional views taken, respectively, on lines 9—9 and 10—10 of Fig. 8; and Fig. 11 is a perspective view of the modified form of bracket shown in Figs. 8 and 10.

In the drawings, 1 designates part of the lower portion of the flush tank having an opening 2 therethrough to receive a water inlet pipe which is disposed in opening 2 and which comprises a nipple 3 attached at its upper end to pipe 4 of reduced interior diameter as compared with that of the nipple. Nut 5 is screw-threaded on nipple 3 to bear against the outer surface of tank 1 about opening 2. Gasket 6 surrounds nipple 3 and bears against the inner surface of the tank about opening 2 and, when pressed against the tank, serves to seal opening 3 against flow of water through the opening outside of nipple 3. Complementary plates 7 (see Fig. 5) having notches 8 to fit into diametrically opposed slots in the outer surface of nipple 3 engage the upper surface of gasket 6. These plates, when assembled with the nipple, may be considered as flanges on the inlet pipe and are hereinafter designated as flanges. These plates or flanges 8 preferably have their outer edges cut away so that when assembled they present a hexagonal outer periphery which may be readily engaged by a wrench, both plates being gripped by a wrench no matter where the latter is applied to flat surfaces thereof. It will be understood that when the flanges 7 are seated in the grooves in the nipple 3, and the nut 5 is screwed upwardly on nipple 3, the gasket 6 will be pressed into engagement with the inner surface of the tank about opening 2, but that when it is desirable to remove the inlet pipe from the tank this may easily be accomplished, in the event nut 5 cannot be turned on the nipple, by simply pulling the plates or flanges 7 out of their grooves. Such removal may be readily accomplished by inserting rigid members in holes 9 in each plate and thereby moving the plate horizontally. This frees the gasket 6 which can be moved upwardly off the inlet pipe after parts thereabove have been removed, whereupon the inlet pipe may be drawn down through opening 2.

The inlet pipe is provided with an annular groove above flanges 7. Preferably this groove is located in the nipple part 3 of the inlet pipe. A bracket is rotatably mounted in said groove. This bracket comprises complementary plates 15 having horizontal portions 16 provided with semi-circular recesses 17 to seat in the said groove and upstanding portions 18 having guiding slots 19 extending downwardly from their upper edges. These bracket members are connected together when in assembled relation with the inlet pipe by clips 20 which extend through holes 21 in the horizontal portions thereof. Preferably, there is enough looseness between bracket 15 and the groove in the inlet pipe so that the bracket may be readily rotated about the inlet pipe.

A shaft 25 is rotatably mounted in opposed holes 26 in the parallel upstanding portions 18 of bracket members 15 and is connected to a lever 27 between the ends of the latter. The end 28 of lever 27 has a screw-threaded opening into which arm 29 carrying float 30 may be adjustably threaded. By adjusting arm 29 in lever 27 more or less of the arm may project from the bracket side of arm 27 and the end of the arm may engage the bracket as an abutment. In this manner the extent of downward movement of arm 27 may be predetermined. The other end of lever 27 is bifurcated and formed with two fingers 31 for a purpose presently to appear.

Hush pipe 35 surrounds portion 4 of the inlet pipe. At its lower end shoe 36 is attached thereto, preferably immovably. This shoe or foot 36 has shoulders 37 disposed closely adjacent to the upstanding portions 18 of the bracket and tongues 38 projecting through slots 19 of the latter (see Fig. 3). It will be understood that shoe 36 serves to maintain the lower end of hush pipe 35 coaxial with inlet pipe 4 for shoulders 37 and tongues 38 prevent any lateral shifting of the hush pipe due to their engagement with the bracket while endwise movement of the hush pipe is permitted by movement of tongues 38 in slots 19.

The side of shoe 36 which is adjacent to arm 27 projects into the space between fingers 31. Thus, float arm 29 is operatively connected to hush pipe 35 by the engagement of fingers 31 on opposite sides of shoe 36. When float 30 is raised by water in tank 1, arm 27 is pivoted about shaft 25 and fingers 31 move hush pipe 35 downwardly and endwise. When float 30 is allowed to move downwardly in the tank arm 27 is pivoted in the opposite direction about shaft 25 with resultant upward endwise movement of hush pipe 35. The extent of this downward movement of float 30 may be regulated as above mentioned by adjusting the extent of projection of arm 29 through lever 27 for when the end of arm 29 abuts against the bracket further downward movement of the float is prevented.

At its upper end inlet pipe 4 has an outlet opening defined by the end surfaces of the pipe. At its upper end hush pipe 35 carries a valve for sealing the outlet end of pipe 4.

The valve shown in Figs. 1 and 4 comprises a dome-shaped structure 40, which is preferably screw-threaded to hush pipe 35 so that it can be adjusted relative to the latter. This structure 40 includes a lower shell 41 which has a tubular portion 42 to surround hush pipe 35, an outwardly extending portion 43 provided with a plurality of openings 44 and an upwardly extending flange portion 45 which receives and is bent inwardly to retain the upper part 46 of the dome structure. Part 46 is partly spherical in shape and has secured to its upper inner side a valve 47 positioned to seat on the upper end of inlet pipe 4. This valve may be attached to part 46 as by a screw 48 projecting upwardly through the valve and part 46 and may be locked in position by nut 49.

A plate 50 extends horizontally across the dome structure, is retained in position by the upper and lower parts of the latter, is provided with a plurality of restricted water passages 51 and has a central opening defined by an inner periphery 52 which engages the outer surface of inlet pipe 1 closely enough to maintain the hush pipe coaxial with inlet pipe 4 while permitting free endwise coaxial movement of the hush pipe relative to the inlet pipe. Ring 55, which is preferably composed of flexible or deformable material, such as natural or synthetic rubber or the like, is positioned within the dome structure beneath plate 50. This ring, which has a central opening a little larger than the outside diameter of inlet pipe 4, may be moved downwardly to close air inlet openings 44 or upwardly to close water passages 51 in plate 50.

It will be understood that the dome structure 40 provides a plurality of successively arranged water restrictions and enlarged chambers which serve greatly to reduce the pressure on the water while it is flowing between inlet pipe 4 and hush pipe 35. The first restriction is the opening between valve 47 and the outlet end of inlet pipe 4. The first chamber is the space in the dome structure above plate 50. The second restriction is afforded by passages 51 in plate 50 which conduct water from the first chamber into the second chamber which is defined in part by plate 51 and ring 55. This second chamber may be visualized by considering that ring 50 is in position to close air passages 44. The third restriction is afforded by the space between the inner periphery of ring 55 and the outer surface of inlet pipe 4, and the third chamber is that between pipe 4 and hush pipe 35. It will be understood that the pressure of the water in pipe 4 will be reduced considerably and in stages before it enters the tank at the lower end of hush pipe 35 by being passed through these three sets of restrictions and chambers and that, since noise in flush tanks is largely traceable to the entry of water under high pressure, the reduction of pressure which is accomplished by these restrictions and chambers is largely responsible for the great decrease in noise which is attained by the present invention.

Although not specifically mentioned heretofore, it will be obvious that when float arm carrying lever 27 is moved about its pivot shaft 25 and hush pipe 35 is moved upwardly, valve 47 will be moved away from its seat at the upper end of inlet pipe 44 and water will flow out into the chamber above plate 51 in the dome structure, thence through passages 51 with resultant movement of ring 55 to close passages 44. The water will continue on down through hush pipe 35 and enter the tank at the lower end thereof. When arm 27 is pivoted in the opposite direction and hush pipe 35 is moved downwardly, valve 47 will seal the upper end of inlet pipe 4 and prevent further flow of water therefrom.

In the event that negative pressure is applied to the interior of the inlet pipe, ring 55 will be moved up against plate 50 and will close passages 51. This action occurs partly because of the reduced pressure in the chamber above plate 51 and partly because of air pressure exerted through openings 44 against the under side of ring 55. Thus the flow of water out of the tank by upward movement through the hush pipe 35 is effectively prevented, it being understood that the dome structure is preferably so mounted in the tank that the passages 44 are a short distance, for example 1", above the water level in the tank.

A refill tube 60 communicates at its lower end with the interior of hush pipe 35 below the predetermined water level in the tank, extends upwardly at an acute angle to the hush pipe and its upper end 61 is bent downwardly to deliver water into the overflow pipe 62. By reason of the angularity of the refill tube, it can be screwed into the hush pipe without interference of its upper end 61 with the overflow pipe 62, and also end 61 may be located over the overflow pipe by simply turning the tube 60.

Sealing one end of the refill tube by locating it below the predetermined water level in the tank prevents the sucking of air into the hush pipe through the refill tube when the water inlet valve begins to close and avoids undesirable bubbling noises.

Since the bracket and hush pipe 35 are freely rotatable relative to the inlet pipe, rotation of the latter as by adjustment of nut 5 has no tendency to rotate the hush pipe and its parts nor, as has frequently happened with prior devices, to wrap the float arm around the inlet pipe. Furthermore, since the hush pipe, bracket and float arm 29 are freely rotatable, these parts may be shifted so that the float arm will clear the overflow pipe 62 and the float 30 will not bear heavily against the side of the tank.

Fig. 8 shows a modified form of valve which may be used with the inlet pipe and hush pipe of Figs. 1 to 6. In this instance the hush pipe carries, at its upper end, a plug 70 to the lower end of which the gasket 71 is attached in any suitable manner. This valve is positioned to seat on the upper end of inlet pipe 4 and to seal the latter against outflow of water into the space between the inlet pipe and hush pipe 35. The valve of Fig. 8 may be, and preferably is, positioned below the predetermined water level in the tank.

Another important feature of the present invention is that the liquid level in the tank may be varied throughout a wide range by a simple adjustment of the valve relative to the hush pipe. When dome 40 of Fig. 1 is turned about and thereby moved to a higher position on hush pipe 35, the shoe 36 will move to a lower plane to seat valve 47 on the upper end of inlet pipe 4. This lowering of shoe 36 will elevate float ball 30 to a higher position in the tank and will permit a higher liquid level in the tank. When the dome is moved down along hush pipe 35, shoe 36 will be raised to a higher position when the valve is seated and the float 30 will also be lowered with resultant lower liquid level in the tank. The same results attend the adjustment of plug 70 in the apparatus of Fig. 7. Thus, the screw-threaded connection between the hush pipe and valve makes possible the control and variation of the liquid level in the tank.

The apparatus shown in Figs. 8 to 11 is generally similar to the apparatus shown in Figs. 1 to 6, inclusive, but with the following exceptions: The inlet pipe 75 carries a spiral spring 76 wrapped therearound near its upper end for the purpose of directing in a spiral path the water flowing from the inlet pipe. By directing water in such a path the noise incident to its flow is reduced. The inside diameter of the spring is substantially the same as the outside diameter of the inlet pipe, while the outside diameter of the spring is only slightly less than the inside diameter of the hush pipe 77. Thus, the spring also serves to center the upper end of the hush pipe on the inlet pipe. The hush pipe 77 may be quite like hush pipe 35 of Fig. 1 and it may be provided with a valve at its upper end and as shown in either Figs. 1 or 6. Hush pipe 77, like pipe 35, is provided with a foot or shoe 78 near its lower end but in this instance the foot is rectangular in plan view for purposes presently to appear.

The inlet pipe 75 includes a body 79 which is formed with a cylindrical portion 80 having a radial inwardly extending annular groove 81 therein and closely adjacent to said portion 80 has an enlarged flange 82 in which an axially extending annular groove 83 is formed. A bracket 84 corresponds in many respects with the bracket of Fig. 1. This bracket consists of opposite upwardly extending sides 85 and an intermediate portion 86 which is slotted inwardly from one end as at 87. This slot is of such a size that the edges of the intermediate portion defining the slot may slide in diametrically opposite parts of radial groove 81 with the result that the bracket may be retained by the groove and yet be permitted to rotate around the inlet pipe. When the bracket is so assembled the under surface of its intermediate portion may rest on the upper surface of the flange 82.

The foot 78 is of such a size that it may fit with guiding engagement between the bracket sides 85 and center the lower end of the hush pipe on the inlet pipe on the diameter at right angles to sides 85. A float arm carrying lever 88 is rotatably mounted in opposed holes in bracket sides 85 above the open end of slot 87 and engages the edge of foot 78 to move the same axially of the hush pipe. This lever also serves to limit movement of the lower end of the hush pipe relative to the inlet pipe toward the open end of slot 87.

Means here shown as a threaded and headed screw 89 extends through a threaded hole in bracket part 86 at the closed end of slot 87 and above axial groove 83. The head of this screw overlies the foot 78 and serves to limit the axial movement of the hush pipe relative to the inlet pipe. The shank of this screw is disposed close to the adjacent side of foot 78 and hence serves to limit lateral movement in that direction from the lower end of the hush pipe. When the threaded end of the screw is in axial groove 83 but out of contact with the bottom wall thereof, the bracket is maintained in assembled position with body 79 and when the end of the screw is forced against the bottom wall of the axial groove, relative rotational movement of the bracket and flange 82 is prevented. Thus the screw 89 limits the axial and lateral movements of the hush pipe and controls rotational and transverse movements of the bracket.

The mode of operation of the apparatus shown in Figs. 8 to 11, inclusive, is substantially the same as has been described hereinabove.

The operation of the apparatus of Fig. 1 has been partly described hereinabove but will be better understood from the following description, part of which is additional to that previously stated. When the device of Fig. 1 is in use and valve 47 has been seated on pipe 4 following the filling of the tank with water up to the indicated level, all the water in housing 40 flows down the hush pipe and the housing and hush pipe are filled with air down to the surface level of water in the tank. When the water pressure on the top of ring 55 is relieved, it springs upwardly due to its own resiliency and uncovers openings 44 through which air enters and fills the housing. If under these conditions a negative pressure is created within inlet pipe 5 and valve 47 is moved away from its seat at the upper end of the pipe, ring 55 may move farther upward and cover openings 51 but air may still flow between pipe 5 and plate 51 due to the sliding fit existing between these parts. However, no tank water can be drawn into the housing because it is filled with air and open to the atmosphere by way of openings 44. So long as that condition exists, no suction force from within pipe 5 can be applied to the interior of the hush pipe which will be sufficient to raise the level of the water therein. Thus, every time valve 47 is closed, water is drained out of the housing 40 and air flows in to fill the housing and water cannot be drawn into the housing from the tank.

The present application is a continuation-in-part of my copending application, Serial No. 608,408, filed August 2, 1945, and now abandoned, and subject matter shown, but not claimed herein, is being claimed in application Serial No. 61,647, filed November 23, 1948, which is also a continuation-in-part of application Serial No. 608,408.

Subject matter shown but not claimed in this application is being claimed in one or another of the following applications: Serial No. 759,064, filed July 5, 1947, now Patent No. 2,598,195; Serial No. 107,072, filed July 27, 1949; and Serial No. 107,073, filed July 27, 1949.

Having thus described the present invention so that others skilled in the art may be able to understand and practice the same, I state that what I desire to secure by Letters Patent is defined in what is claimed.

What is claimed is:

1. In a flush tank, a fixed inlet pipe having a valve seat at its open end and a body near the wall of the tank through which the pipe projects, said body having an annular groove disposed at substantially right angles to the longitudinal axis of the pipe and another annular groove substantially coaxial with said pipe, a hush pipe around and movable axially relative to said inlet pipe having a valve to seat on said seat, a bracket having an intermediate slotted portion to extend into said transverse groove, a screw extending through said bracket and projecting into said concentric groove, a foot on the hush pipe between and substantially engaging the side portions of said bracket, and a float arm lever rotatably carried by said bracket and engaging said foot.

2. In a flush tank, a fixed inlet pipe having a valve seat at its open end and a body near the wall of the tank through which the pipe projects, said body having an annular groove disposed at substantially right angles to the longitudinal axis of the pipe and another annular groove substantially coaxial with said pipe, a hush pipe around and movable axially relative to said inlet pipe having a valve to seat on said seat, a bracket having an intermediate slotted portion to extend into said transverse groove, a screw extending through said bracket and projecting into said concentric groove, and float controlled means carried by said bracket for engaging and moving said hush pipe axially.

3. In a flush tank having a fixed inlet pipe and a valve seat at its open end, and a hush pipe around and movable axially relative to said inlet pipe and having a valve near one end to seat on said seat and a foot adjacent to its other end, the combination of a body constituting part of said inlet pipe, said body including a cylindrical portion having a radial, inwardly extending, annular groove and an adjacent flange having an axially extending, annular groove, a bracket having parallel side portions having guiding engagement with said foot and an intermediate portion having a slot open at one end and edges along the slot extending into diametrically opposite parts of said radial groove, a float arm lever rotatably carried between said side portions of the bracket and engaging said foot adjacent the open end of said slot, and a screw adjustable in the intermediate portion of said bracket, the shank of said screw having guiding engagement with said foot on the side opposite said lever, the head of the screw overlapping said foot and constituting a stop limiting movement of the hush pipe axially in one direction, and the threaded end of the screw cooperating with the said annular groove to control rotational and transverse movement of the bracket relative to said inlet pipe.

4. In a flush tank, a fixed inlet pipe having a valve seat at its outlet end, a hush pipe around and movable endwise and rotatably relative to said inlet pipe, a bracket connected to said inlet pipe for free rotational, non-axial movement relative thereto, said hush pipe and bracket being connected for non-relative rotational movement, a valve to engage said seat, means to vary the extent of opening of said valve including a float lever pivotally connected to said bracket and engaging said hush pipe for reciprocating the latter endwise, and means for varying the level of water in the tank including a housing carrying said valve and having screw-threaded engagement with the hush pipe for predetermined positioning on the latter.

5. In a flush tank, a fixed inlet pipe having a valve seat at its outlet end, a hush pipe around and movable endwise and rotatably relative to said inlet pipe, a bracket connected to said inlet pipe for free rotational, non-axial movement relative thereto, said hush pipe and bracket being connected for non-relative rotational movement, a valve to engage said seat, means to vary the extent of opening of said valve including a float lever pivotally connected to said bracket and engaging said hush pipe for reciprocating the latter endwise and a float arm attached to said lever, and means for varying the level of water in the tank including a housing carrying said valve and having screw-threaded engagement with the hush pipe for predetermined positioning on the latter.

6. In a flush tank, a fixed inlet pipe having a valve seat at its outlet end, a hush pipe around and movable endwise and rotatably relative to said inlet pipe, a bracket connected to said inlet pipe for free rotational, non-axial movement relative thereto, said hush pipe and bracket being connected for non-relative rotational movement, a valve to engage said seat, means to vary the extent of opening of said valve including a float lever pivotally connected to said bracket and engaging said hush pipe for reciprocating the latter endwise and a float arm extending through said lever for abutting, pivot-motion-limiting engagement with said bracket, and means for varying the level of water in the tank including a housing carrying said valve and having screw-threaded engagement with the hush pipe for predetermined positioning on the latter.

7. In a flush tank, a fixed inlet pipe having a valve seat at its outlet end and having an external groove, a hush pipe around and movable endwise and rotatably relative to said inlet pipe, a bracket projecting into said groove and being freely rotatable relative to said inlet pipe, said hush pipe and bracket being connected for simultaneous rotational movement, a valve to engage said seat, means to vary the extent of opening of said valve including a float lever pivotally connected to said bracket and engaging said hush pipe for reciprocating the latter endwise, and means for varying the level of water in the tank including a housing carrying said valve and having screw-threaded engagement with the hush pipe for predetermined positioning on the hush pipe.

8. In a flush tank, a fixed inlet pipe having a valve seat at its outlet end and having an external groove, a hush pipe around and movable endwise and rotatably relative to said inlet pipe, a bracket having transverse and parallel portions on opposite sides of said pipe, the transverse portions extending into said groove for free rotation of the bracket around the inlet pipe, said hush pipe and bracket being connected for simultaneous rotational movement, a valve to engage said seat, means to vary the extent of opening of said valve including a float lever pivotally connected to the parallel portions of said bracket and engaging said hush pipe for reciprocating the latter endwise, and means for varying the level of water in the tank including a housing carrying said valve and having screw-threaded engagement with the hush pipe for predetermined positioning on the hush pipe.

9. In a flush tank, a fixed inlet pipe having a valve seat at its outlet end and having an external groove, a hush pipe around and movable endwise and rotatably relative to said inlet pipe, a bracket projecting into said groove and being freely rotatable relative to said inlet pipe, a foot on said hush pipe engaging said bracket for guiding axial, non-rotational movement of the hush pipe relative to said bracket, a valve to engage said seat, means to vary the extent of opening of said valve including a float lever pivotally connected to said bracket and engaging said hush pipe for reciprocating the latter endwise, and means for varying the level of water in the tank including a housing carrying said valve and having screw-threaded engagement with the hush pipe for predetermined positioning on the hush pipe.

10. In a flush tank, a fixed inlet pipe having a valve seat at its outlet end, a hush pipe around and movable endwise and rotatably relative to said inlet pipe, a bracket connected to said inlet pipe for free rotational, non-axial movement relative to the latter, a valve to engage said seat, means to vary the extent of opening of said valve including a float lever pivotally connected to said bracket and having a bifurcated end engaging with said hush pipe for reciprocating the latter endwise, and means for varying the level of water in the tank including a housing carrying said valve and having screw-threaded engagement with the hush pipe for predetermined positioning on the hush pipe.

11. In a flush tank, a fixed inlet pipe having a valve seat at its outlet end, a hush pipe around and movable endwise and rotatably relative to said inlet pipe, a bracket connected to said inlet pipe for free rotational, non-axial movement relative to the latter, a foot on said hush pipe engaging said bracket for guiding axial, non-rotational movement of said hush pipe relative to said bracket, a valve to engage said seat, means to vary the extent of opening of said valve including a float lever pivotally connected to said bracket and having rack and pinion engagement with said hush pipe for reciprocating the latter endwise, and means for varying the level of water in the tank including a housing carrying said valve and having screw-threaded engagement with the hush pipe for predetermined positioning on the hush pipe.

12. In a flush tank, a fixed inlet pipe having a valve seat at its outlet end, a hush pipe around and movable endwise and rotatably relative to said inlet pipe, a bracket connected to said inlet pipe for free rotational non-axial movement relative to said inlet pipe, said bracket having apertures on opposite sides of said inlet pipe, a foot on the hush pipe having tongues disposed in said apertures, a valve to engage said seat, means to vary the extent of opening of said valve including a float lever pivotally connected to said lever and engaging said hush pipe for reciprocating the latter endwise, and means for varying the level of water in the tank including a housing carrying said valve and having screw-threaded engagement with the hush pipe for predetermined positioning on the hush pipe.

HARRY FORD SMITH.

REFERENCES CITED

The following references are of record in the file of this patent:

UNITED STATES PATENTS

| Number | Name | Date |
|---|---|---|
| 1,035,503 | Webb | Aug. 13, 1912 |
| 1,117,013 | Evans | Nov. 10, 1914 |
| 1,185,350 | Seaman | May 30, 1916 |
| 1,257,295 | Slattery | Feb. 19, 1918 |
| 1,294,908 | Hill | Feb. 18, 1919 |
| 1,313,797 | Demilt | Aug. 19, 1919 |
| 1,368,884 | Bozeman | Feb. 15, 1921 |
| 1,606,274 | Utley | Nov. 9, 1926 |
| 1,649,620 | Siefen | Nov. 15, 1927 |
| 1,839,042 | McPartland | Dec. 29, 1931 |
| 1,943,769 | Melio | Jan. 16, 1934 |
| 2,086,646 | Stebbins | July 13, 1937 |
| 2,247,525 | Sherwood | July 1, 1941 |
| 2,270,910 | Svirsky | Jan. 27, 1942 |
| 2,290,145 | Owens | July 14, 1942 |
| 2,292,373 | Groeniger | Aug. 11, 1942 |
| 2,294,785 | Langdon | Sept. 1, 1942 |
| 2,367,951 | Lewis | Jan. 23, 1945 |
| 2,382,427 | Langdon | Aug. 14, 1945 |
| 2,430,152 | Wiley | Nov. 4, 1947 |
| 2,444,958 | Smith | July 13, 1948 |